United States Patent [19]

Byland

[11] 3,783,343
[45] Jan. 1, 1974

[54] CONTAINER IN WHICH A WATTHOUR METER AND A METER SOCKET ARE ENCLOSABLY MOUNTABLE AND FOR READABLY DISPLAYING THE WATTHOUR METER

[76] Inventor: Clarence H. Byland, 1122 E. Concorda Dr., Phoenix, Ariz. 85281

[22] Filed: Apr. 27, 1972

[21] Appl. No.: 248,031

Related U.S. Application Data

[63] Continuation-in-part of Ser. No. 78,130, Oct. 5, 1970, abandoned.

[52] U.S. Cl. .............. 317/107, 317/111, 174/52 R, 324/156
[51] Int. Cl. .............................................. H02b 9/00
[58] Field of Search ............... 174/48, 50, 51, 52 R, 174/60; 317/99, 104, 105, 107, 111, 120; 324/156

[56] References Cited
UNITED STATES PATENTS

| 3,170,090 | 2/1965 | Waldrop | 317/104 |
|---|---|---|---|
| 3,123,744 | 3/1964 | Fisher | 324/156 |
| 3,368,118 | 2/1968 | Orr | 324/156 X |
| 3,397,346 | 8/1968 | Sloop | 317/104 |
| 2,063,099 | 12/1936 | Loock | 174/52 R |
| 1,811,294 | 6/1931 | Bauroth | 174/50 X |
| 635,485 | 10/1899 | Hundhausen | 174/50 |
| 2,323,252 | 6/1943 | Sparkes | 317/111 |
| 3,279,871 | 10/1966 | Bright | 317/120 X |
| 3,286,133 | 11/1966 | Sturdwan | 317/104 |

Primary Examiner—Robert K. Schaefer
Assistant Examiner—Gerald P. Tolin
Attorney—Herbert E. Haynes, Jr.

[57] ABSTRACT

A container in which a watthour meter and meter socket are mountable for total enclosure thereof is provided with means therein for supporting the meter in conductive contact with the socket and for grounding the meter to the container.

4 Claims, 7 Drawing Figures

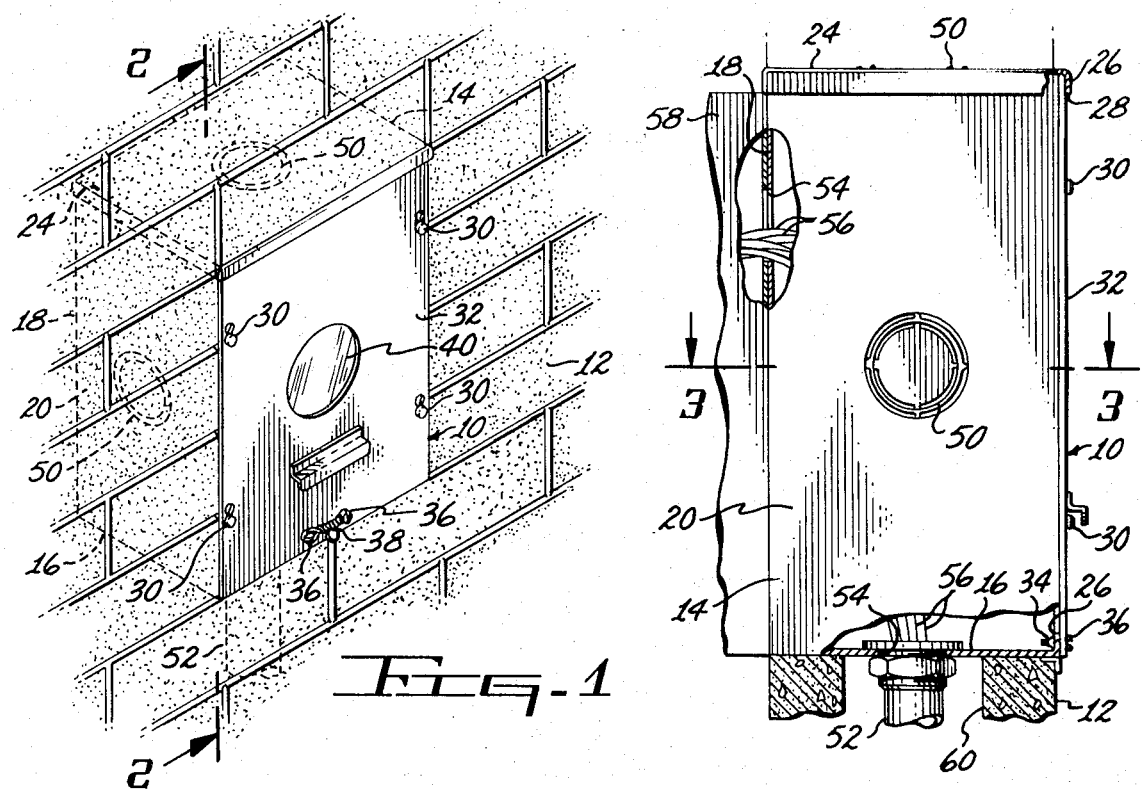
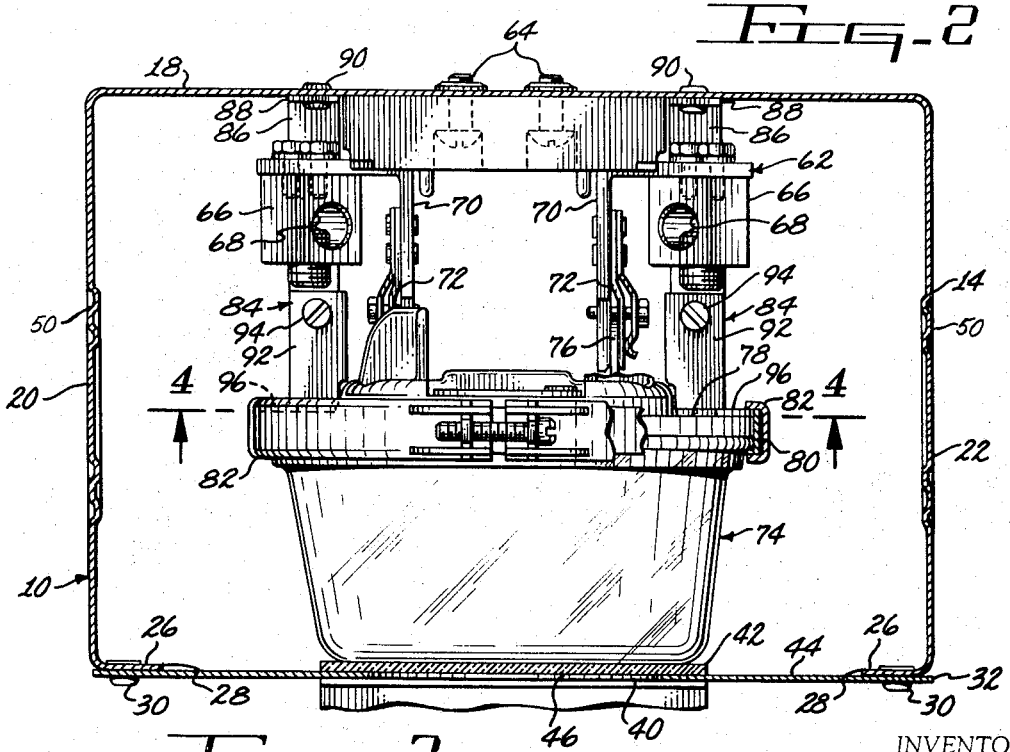
INVENTOR.
CLARENCE H. BYLAND

CONTAINER IN WHICH A WATTHOUR METER AND A METER SOCKET ARE ENCLOSABLY MOUNTABLE AND FOR READABLY DISPLAYING THE WATTHOUR METER

CROSS-REFERENCE TO RELATED APPLICATIONS

This application is a continuation-in-part of a copending application entitled CONTAINER FOR TOTALLY ENCLOSING METERING EQUIPMENT Ser. No. 78,130, filed Oct. 5, 1970, now abandoned by the same inventor.

BACKGROUND OF THE INVENTION

1. Field of the Invention

This invention relates to power metering equipment, and more particularly to a container for total enclosure of a watthour meter and a meter sockt.

2. Prior Art

Providing electrical service to a homeowner or small business establishment with the necessary metering, circuit breakers, wiring conduits, and other equipment, has traditionally resulted in a conglomeration of boxes, conduits, meters, and the like tacked on to a wall of the building. This type of tacked on installation not only creates a poor esthetic effect, but it exposes some of the equipment and the containers to the elements, accidental breakage and to vandalism.

The traditional prior art method of providing electric service to a consumer comprises routing of the power lines, either overhead or underground to the back or side of a building. The power lines are then encased within rigid conduits attached to the side of the building which route the lines to a junction box commonly called a meter trough. The lines are routed and connected to a meter socket which is mounted within the trough, the socket is adapted to have the watthour meter plugged into it. The meter is rigidly mounted on an external surface of the trough and is provided with prongs which enter into the trough and engage the socket.

Another prior art method of mounting the meter socket and meter is to mount them in close proximity to the trough and connecting them with a power line carrying conduit.

Both of these prior art methods result in the glass envelope of the meter extending from its mounting container and thus locates it in a vulnerable spot.

In both of the hereinbefore described prior art mounting methods the power lines are routed from the meter socket to another separate box mounted adjacent thereto which contains fuses, circuit breakers and the like. From the circuit breaker or fuse box the power is then distributed to the circuits within the building.

These prior art metering equipment mounting methods result in two, and in some instances three, separate containers interconnected by conduits mounted on the exterior portions of a wall.

Accidental breakage or vandalism which results in breakage of the glass portion of the meter exposes high voltages. Therefore, metering equipment installations are rigidly controlled. For example, no metering equipment may be installed in close proximity to storage areas which contain or may contain any inflammable materials.

Frequently a change in the type of electrical service provided to a consumer is required. These changes may be, for example, changing from a 150 amp service to 200 amp service. This change of service and equipment is sometimes referred to as a change-out. Performing a change-out requires not only changing the meter and meter socket, it also requires changing the trough, as a different trough is designed to handle each type of service. Therefore, performing a change-out in the prior art methods of providing electrical service is time consuming and expensive.

Hence the need exists for a new and useful container for totally enclosing utility metering equipment.

SUMMARY OF THE INVENTION

In accordance with the invention disclosed, a new and useful housing or trough is provided for total containment of power metering equipment.

The container or meter trough of this invention is designed primarily for installation within a wall which may be fabricated in accordance with any conventional construction method. However, the trough may also be attached to the surface of the wall.

The container is an open front box-shaped structure with a demountably attached access panel covering the opening thereof. The container is mounted so that the access panel is flush with the exterior surface of a wall. The access panel is provided with a meter viewing port formed therein. The container totally encloses a meter socket and a watthour meter when this equipment is mounted therein. The container is provided with conventional knock-out panels formed in the various surfaces thereof to provide means for routing power lines to and from the metering equipment.

The meter socket is removably mountable within the container so that the socket may be changed without replacing the entire container. The watthour meter is supportingly positionable on a meter mounting means provided within the container which supports the meter in conductive contact with the socket and grounds the meter to the container. The meter mounting means is movable to provide access to the socket for servicing and for changing thereof.

Accordingly, it is an object of the present invention to provide a new and useful container for power metering equipment.

Another object of the present invention is to provide a new and useful container which totally encloses power metering equipment to protect it from accidental breakage and vandalism.

Another object of the present invention is to provide a new and useful container for total enclosure of power metering equipment, the container being adapted for mounting on a wall surface or within the wall.

Another object of the present invention is to provide a new and useful container for total enclosure of power metering equipment, the container having a demountably attached access panel which is provided with a meter viewing port formed therein.

Another object of the present invention is to provide a new and useful container for power metering equipment in which a watthour meter and a meter socket are removably mountable.

Still another object of the present invention is to provide a new and useful container for total enclosure of power metering equipment in which a meter mounting means is provided upon which a watthour meter is supportingly positionable.

Yet another object of the present invention is to provide a new and useful container of the above described character in which a watthour meter is supportingly positionable upon meter mounting means, said means being movable for servicing purposes.

The foregoing and other objects of this invention as well as the invention itself, may be more fully understood when read in conjunction with the following drawings.

BRIEF DESCRIPTION OF THE DRAWINGS

FIG. 1 is a fragmentary isometric view of a portion of a wall having a power metering equipment container of the present invention installed therein;

FIG. 2 is a sectional view, partially broken away, taken on the line 2—2 of FIG. 1;

FIG. 3 is an enlarged sectional view taken on the line 3—3 of FIG. 2;

DESCRIPTION OF THE PREFERRED EMBODIMENT

Figure 4:
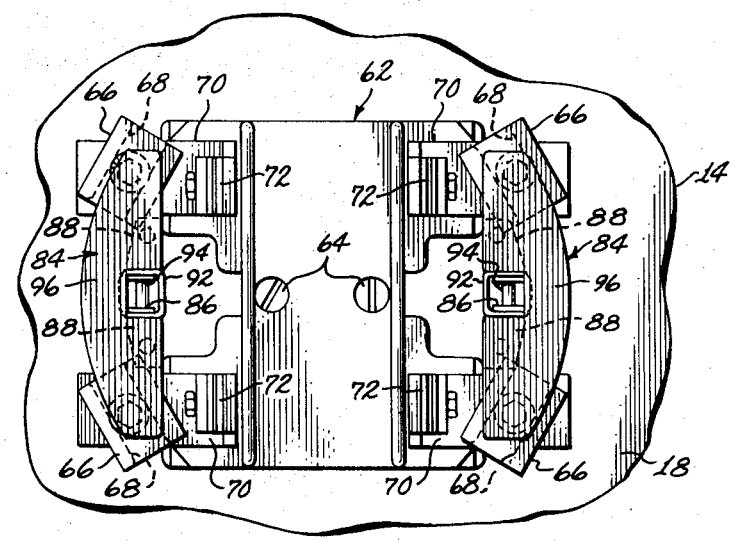
FIG. 4 is a fragmentary sectional view taken on the line 4—4 of FIG. 3.

Referring now to FIG. 1 wherein a container 10 of the present invention is shown installed within a wall 12. The wall 12 is shown as being constructed of cement block, but it should be understood that it is not intended to limit the scope of this invention to a particular type of wall structure, as frame construction or any other suitable building material or construction method may be used. Also, the container 10 may be installed on the surface of a wall (not shown) when conditions and/or regulations require such installations.

As seen best in FIGS. 1, 2, and 3, the container 10 is illustrated as a substantially rectangular open front box-shaped housing 14 having a bottom panel 16, a back panel 18, two spaced apart side walls 20 and 22, and a top 24 which define the internal cavity of the housing. Each of the side panels 20 and 22 as well as the top 24 and bottom 16 are provided with inwardly directed flanges 26 which circumscribe an access opening 28 or the open face of the container. The flanges 26 which are formed in side walls 20 and 22 are provided with mounting devices 30 for retaining an access panel 32 thereon. The mounting devices 30 are shown as fixedly attached studs having extending portions which are engageable with inverted keyhole slots formed in the panel 32.

The flange 26 formed in the bottom 16 is provided with captive nuts 34 which are positioned to be threadably engaged by suitable bolts or screws 36 which pass through holes provided in access panel 32. The screws 36 are provided with conventional lock wire holes formed therein so that when the lid 32 is mounted on the housing 14, suitable lock wire and seal 38 may be installed to prevent unauthorized removal of the panel 32.

The panel 32 is provided with a meter viewing panel or port 40 formed therein. The meter viewing port may comprise a sheet of transparent material 42 suitably attached to the interior surface 44, and positioned adjacent to an aperture 46 formed within the panel 32.

As seen in FIG. 2, the flange 26 formed on top 24 extends outwardly and depends downwardly from the top 24 of the container to form a sugstantially rain-tight enclosure when the panel 32 is installed.

The container 10 is provided with concentrically formed knock-out portions 50 in each of the surfaces 16, 18, 20, 22, and 24 to provide connection means for wire conducting conduits 52 such as that shown in FIG. 2. The concentric knock-out portions 50, as well known in the art, are designed for accepting either 2 inch or 2 and ½ inch conduits. It should also be noted that a plurality of knock-outs may be provided in each surface as required for a particular type of building structure.

Positioning of the knock-outs make it possible for the container 10 to be used in all standard types of wall construction which normally range in depth from 4 inches to 8 inches.

When the container 10 is installed within a relatively thick wall such as that shown in FIG. 2, the conduit 52 may be positioned within the wall and a centrally located knock-out is removed to provide a hole 54 to which the conduit is connected. This installation is shown as adapting the container 10 for an underground service; the same type of conduit routing and connection may be made to top surface 24 of container 10 if overhead service is provided to the building. As shown in FIG. 2 when the container 10 is used within the standard eight inch cement block wall, the conduits 52 may be positioned within openings or cells 60 formed in the blocks as well known in the art.

If the container 10 is to be installed within a relatively thin wall, off-set knock-outs formed in the sides, bottom, and top panels (not shown) may be used so that the conduits 52 would extend from the container and lay flush with the interior surface of the wall.

One or more knock-outs may be provided in back surface 18 so that power lines 56 may be routed from the metering equipment installed in the container 10 to a fuse or circuit breaker panel 58. Circuit breaker panel 58 may be suitably attached to surface 18, thus eliminating the need for a conduit which would normally run from the container to the remotely located fuse or circuit breaker panel 58. Mounting of the panel 58 as hereinbefore described provides the additional feature of the panel 58 being positioned within the building, thus providing easy access for servicing and protection of the equipment from the elements.

Concentric knock-outs 50 which are provided in side walls 20 and 22 may be used for power line routing to the remotely located panel 58, or may be used for routing power to other internal circuitry of the building.

As seen best in FIGS. 3 and 4, a standard 200 amp meter socket 62 is removably mountable by screws 64 or other suitable fastening means to the interior surface of the back panel 18 of the container.

Meter socket 62 is of conventional design and is provided with the normal ground and power lugs 66, each of which is provided with an aperture 68 formed therethrough to which power lines 56 are connected. Each of the lugs 66 is attached to one end of an L-shaped conductor 70, the other end of which is provided with a female connector 72 formed thereon.

A standard power meter 74 or watthour meter having male connectors or prongs 76 each of which is positioned on the meter to align with a different one of the female connectors 72 of the L-shaped conductor 70. The meter 74 coupled to the meter socket 62 as hereinbefore described is a standard mounting technique and is well known in the art.

To meet all safety requirements as set by the public utilities and governmental agencies, the meter 74 must be rigidly supported in conductive contact with the meter socket and must be grounded to the container 10. Therefore, each standard meter 74 is formed with a flange 80 which is adapted for use with a standard ring clamp 82.

To accomplish the required support and grounding of the watthour meter 74 when it is mounted within the container 10, a meter mounting means 83 is provided within the container.

Figure 5:
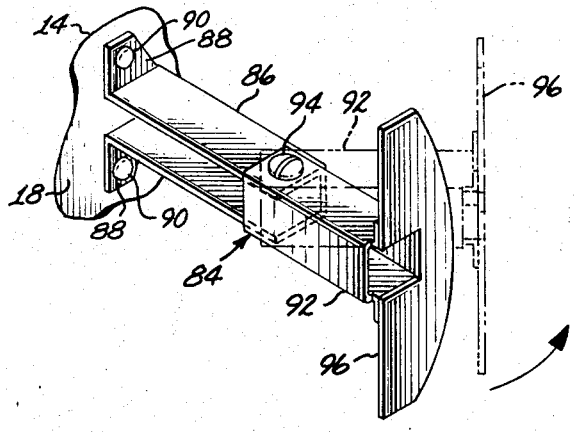
FIG. 5 is an isometric view of one of a pair of a meter mounting means of the present invention.

One form of the meter mounting means 83 is illustrated in FIGS. 4 and 5 and are shown to comprise a pair of spacedly arranged movable brackets 84. As best seen in FIG. 5, wherein one of the brackets 84 is illustrated, the brackets are provided with a fixed leg 86 having mounting flanges 88 formed on one end thereof which are attached by rivets 90 or other suitable means to the internal surface of back panel 18. Each of the brackets 84 is provided with a movable leg 92 pivotably mounted on the other end of fixed leg 86 by means of a pivot pin 94. Each of the movable legs 92 is provided with an arcuate or segmental mounting flange 96 fixed to the outermost end thereof which is perpendicularly disposed with respect to the movable arm 92.

As seen best in FIG. 4 the segmental mounting flanges 96 of the brackets 84 are positioned substantially equidistant between the back panel 18 and the access panel 32 and are thus positioned to abut a rear surface 78 of the flange 80 of meter 74 when the meter is coupled to the meter socket 62. The abutting contact of segmental flanges 96 with the back surface 78 of the flange 80 is assured and maintained by the clamp 82 which engages the flange 80 of the meter and the segmental flanges 96 of the movable arms 84.

As well known in the art, watthour meters are provided with grounding strips or lugs (not shown) on the back surface 78 thereof. These grounding strips are positioned between the abutting surfaces of segmental flanges 96 and flanges 80 to provide grounding contact between the meter 74 and the support brackets 84.

As seen in FIG. 5 each of the support brackets is movable or pivotable about pin 94 from the solid line position to the dash line position. This movable feature allows the meter to be removed and the support brackets pivoted out of the way so that safe and easy access to the lugs 66 is provided.

Figure 6:
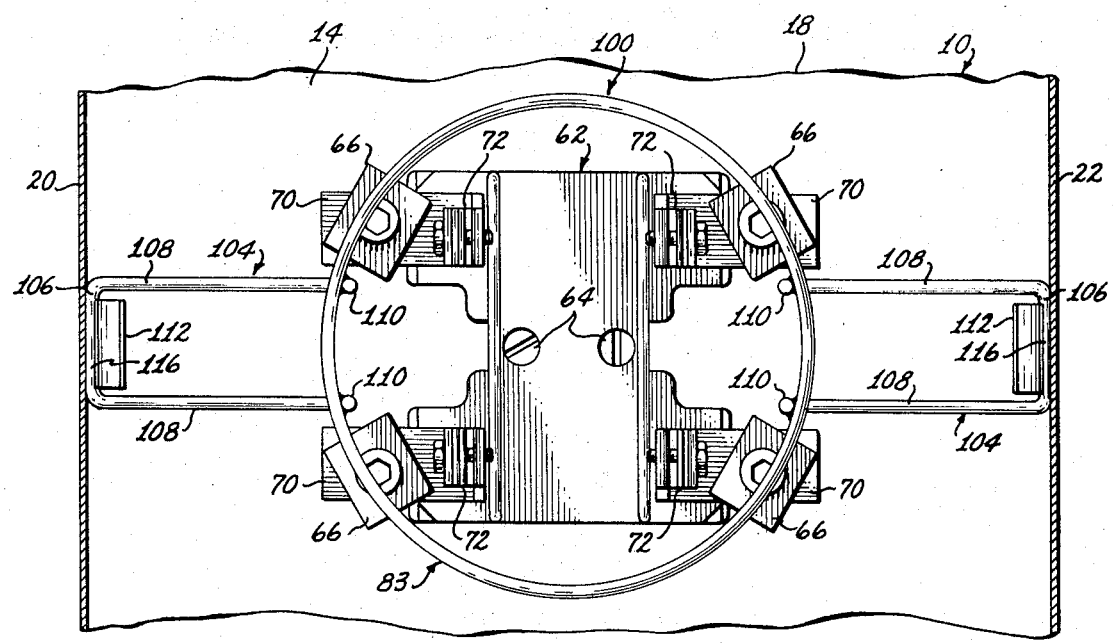
FIG. 6 is a fragmentary sectional view similar to FIG. 4 and illustrating a modification of the meter mounting means of the present invention.
Figure 7:
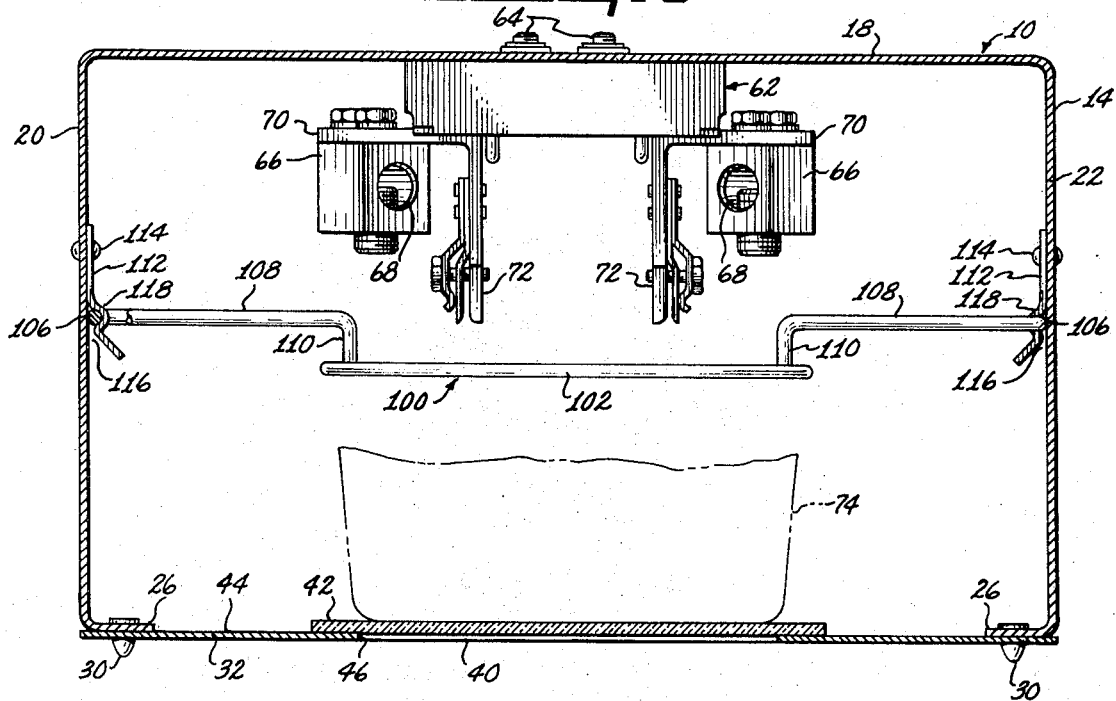
FIG. 7 is a fragmentary sectional plan view of the modification shown in FIG. 6.

With reference now to FIGS. 6 and 7 wherein a modification of the meter mounting means 83 is shown. This modification comprises a bracket assembly 100 upon which the watthour meter 74 is mountable to provide support and grounding therefor as did the previously described brackets 84.

The bracket assembly 100 includes a ring shaped flange 102 having a pair of radially extending diametrically opposed U-shaped bails 104 affixed thereto. The bails 104 each are formed with a bight portion 106 from which a pair of parallel tines 108 extend inwardly toward the flange 102. The tines 108 each have an elbow 110 formed on their inner ends which are fixidly attached to the flange 102 to axially displace the bails along the longitudinal axis of the flange 102.

The bracket assembly 100 is removably mounted within the container 10 by a pair of spring clips 112 which are suitably attached to the inner surfaces of side walls 20 and 22 such as by rivets 114. The clips 112 are positioned on their respective side walls 20 and 22 so that when the bracket assembly 100 is mounted thereto, it will be positioned approximately equidistant between the rear panel 18 and the access panel 32.

Mounting of the bracket assembly 100 is accomplished by sliding the bights 106 of the bails 104 into open portions 116 of the clips 114 until they snap into detents 118 formed therein.

As seen best in FIG. 7, the bracket assembly 100 is positioned so that the off-set relationship of the flange 102 and the bails 104 results in the flange being disposed closer to the access panel 32. This positioning allows the ring clamp 82 (FIG. 3) to engage the flange 102 and the meter 74 to supportingly position the meter in conductive contact with the meter socket 62 at a location interposed between the socket and the access panel.

To conform with safety requirements, the container 10 may be constructed of heavy steel and has a coating of epoxy which is then covered by acrylic enamel which is resistant to the elements.

The internal surfaces of the metering trough 10 may be provided with a reflective finish so that the connections may be viewed without the aid of artificial light. This reflective surface may be selectively applied and may also be of insulated material to prevent accidental grounding of the power leads during servicing of the metering equipment.

As hereinbefore stated, meter socket 62 is illustrated as the socket for use with 200 amp service. To provide a change-out of service, for example, from a 200 amp service to a 150 amp service, changing of the 200 amp socket to a 150 amp socket would be required. To accomplish the change-out, the meter 74 is removed by removing the clamp 82, the meter mounting means 83 is then moved as previously described to permit access to the meter socket. The power lines 56 are then disconnected from lugs 66, screws 64 are then removed which allows the 200 amp meter sock to be removed. A 150 amp meter socket has the same dimensions as the 200 amp socket with the exception that its depth dimensions are smaller. To position the 150 amp socket so that it will connect to the meter and still allow the use of the same meter mounting means 83, a shim or mounting block (not shown) is inserted between the internal surface of back panel 18 and the 150 amp meter socket.

While the principles of the invention have now been made clear in the preferred embodiment, there will be immediately obvious to those skilled in the art many modifications in structure, arrangements, proportions, the elements, and the materials used in the practice of the invention, and otherwise, which are particularly adapted to specific environments and operating requirements without departing from those principles. The appended claims are therefor intended to cover and embrace any such nodifications within the limits only of the true scope of the invention.

What I claim is:

1. A container for totally enclosing a watthour meter of the type having a circular base, said container comprising:

a. an open front box-shaped housing having a back panel from which a top, a bottom and a pair of side walls perpendicularly extend to form an internal cavity within said housing;
b. a meter socket into which the watthour meter is plugable, said meter socket mounted on the inner surface of the back panel of said housing;
c. an access panel demountably attached to said housing for closing the open front thereof, said access panel having a viewing port formed therein which is closed with a sheet of transparent material; and
d. a pair of brackets each mounted on one end thereof to the inner surface of the back panel of said housing and extend perpendicularly therefrom, said brackets respectively mounted adjacent to opposite sides of said meter socket and extending into the internal cavity of said housing a distance which positions their extending ends substantially equidistant between the back panel of said housing and said access panel, the extending end of each of said brackets having a segmental flange formed thereon upon which the circular base of the watthour meter is demountably attachable for supporting the meter in conductive contact with said meter socket at a location interposed between said meter socket and said access panel when the meter is installed within said housing, each of said brackets are movable from their perpendicularly extended positions to a forwardly angularly outwardly disposed position to permit access to said meter socket for servicing thereof.

2. A container as claimed in claim 1 wherein each of said pair of brackets comprises:
a. a fixed leg having mounting flanges on one end thereof attached to the backpanel of said housing; and
b. a movable leg pivotably attached on one end thereof to the other end of said fixed leg and having the segmental flange of said bracket transversely formed on the other end of said movable leg.

3. A container for totally enclosing a watthour meter of the type having a circular base, said container comprising:
a. an open front box-shaped housing having a back panel from which a top, a bottom and a pair of side walls perpendicularly extend to form an internal cavity within said housing;
b. A meter socket into which the watthour meter is plugable, said meter socket mounted on the inner surface of the backpanel of said housing;
viewing port formed therein which is closed with a sheet of transparent material; and
d. a bracket assembly extending between the side walls of said housing and attached thereto at a location substantially equidistant between the back panel of said housing and said access panel, said bracket assembly having a ring shaped flange formed thereon upon which the circular base of the watthour meter is demountably attachable and a pair of U-shaped bails respectively attached to the ring shaped flange thereof at diametrically opposed locations, each of said bails radially extending from the ring shaped flange for engaging the side walls of said housing, said bracket assembly for supporting the meter in conductive contact with said meter socket at a location interposed between said meter socket and said access panel when the meter is installed within said housing.

4. A container as claimed in claim 3 wherein each of said bails comprises:
a. a bight portion engaged with one of the side walls of said housing;
b. a pair of tines extending from opposite ends of said bight portion and parallel with respect to each other, said tines extending toward the ring-shaped flange;
c. an elbow formed in the extending ends of said tines, said elbows attached to said ring-shaped flange for axially displacing said bail along the longitudinal axis of said ring-shaped flange.

* * * * *